US009781126B1

(12) United States Patent
Winn et al.

(10) Patent No.: US 9,781,126 B1
(45) Date of Patent: Oct. 3, 2017

(54) EXPORT CONTROL AND CLEARANCE AUTHORIZATION FOR A MULTI-USER CAX ENVIRONMENT

(71) Applicant: United Technologies Corporation, Hartford, CT (US)

(72) Inventors: Joshua Daniel Winn, Ellington, CT (US); Nelson DaCunha, Avon, CT (US)

(73) Assignee: United Technologies Corporation, Farmington, CT (US)

( * ) Notice: Subject to any disclaimer, the term of this patent is extended or adjusted under 35 U.S.C. 154(b) by 178 days.

(21) Appl. No.: 14/608,280

(22) Filed: Jan. 29, 2015

Related U.S. Application Data (60) Provisional application No. 61/938,207, filed on Feb. 11, 2014.

(51) Int. Cl.
*H04L 29/06* (2006.01)

(52) U.S. Cl.
CPC .......... *H04L 63/105* (2013.01); *H04L 63/101* (2013.01)

(58) Field of Classification Search
CPC ..... H04L 63/10; H04L 63/101; H04L 63/105; G06F 21/60; G06F 21/604; G06F 21/62
See application file for complete search history.

(56) References Cited

U.S. PATENT DOCUMENTS

| 8,229,715 | B1 | 7/2012 | Teller et al. |
| 2013/0144566 | A1 | 6/2013 | De Biswas |
| 2014/0032670 | A1* | 1/2014 | Ellingson ............. H04L 65/403 709/204 |
| 2014/0149882 | A1 | 5/2014 | Nysetvold et al. |
| 2014/0222387 | A1 | 8/2014 | Cannon et al. |
| 2014/0222919 | A1 | 8/2014 | Nysetvold et al. |
| 2014/0236550 | A1 | 8/2014 | Nysetvold et al. |
| 2014/0278269 | A1* | 9/2014 | Winn ..................... G06F 17/50 703/1 |

OTHER PUBLICATIONS

Robert Aaron Moncur, "Data Consistency and Conflict Avoidance in a Multi-User CAx Environment", Brigham Young University, BYU ScholarsArchive, Jul. 19, 2012, pp. 1-71.*

(Continued)

*Primary Examiner* — Edward Zee
*Assistant Examiner* — Chi Nguy
(74) *Attorney, Agent, or Firm* — Carlson, Gaskey & Olds, P.C.

(57) ABSTRACT

A system for authorization level verification includes a host computer having a processor and a memory. The processor and memory are configured to operate a multi-user CAx environment. The host computer further includes an authorization level module and an authorization level adjustment module. The host computer is configured to communicate with a plurality of local computers. Each of the local computers are configured to operate a local CAx environment of the multi-user CAx environment. A data storage element is in communication with the host computer and is configured to store a part file compatible with the multi-user CAx environment. The authorization level module is configured to facilitate a user login from one or more of the plurality of local computers.

16 Claims, 5 Drawing Sheets

(56) References Cited

OTHER PUBLICATIONS

Felicia Diane Marshall, "Model Decomposition and Constraints to Parametrically Partition Design Space in a Collaborative CAx Environment", Brigham Young University, BYU ScholarsArchive, Dec. 12, 2011, pp. 1-104.*

Xu, Yue, A Flexible Context Architecture for a Multi-User GUI, Thesis, Dec. 2010, Department of Mechanical Engineering, Brigham Young University.

Red, Edward, David French, Ammon Hepworth, Greg Jensen, and Brett Stone, Multi-User Computer-Aided Design and Engineering Software Applications, Cloud-Based Design and Manufacturing (CBDM), Jan. 1, 2014, pp. 25-62, Springer International Publishing.

Red, Edward, Greg Jensen, Jordan Ryskamp, and Kenneth Mix, NXConnect: Multi-User CAx on a Commercial Engineering Software Application, Department of Mechanical Engineering, Brigham Young University. 2010 PACE Global Annual Forum.

* cited by examiner

EXPORT CONTROL AND CLEARANCE AUTHORIZATION FOR A MULTI-USER CAX ENVIRONMENT

CROSS-REFERENCE TO RELATED APPLICATION

This application claims priority to U.S. Provisional Application No. 61/938,207 filed on Feb. 11, 2014.

BACKGROUND

This disclosure relates to computer-aided technologies (CAx), and more particularly, to visualization of component designs in a computing environment.

CAx software is used to develop tools, parts, assemblies, structures and other components using a computer system during the design, analysis, and manufacturing phases, for example. CAx software may be used by a user or group of users to build, analyze, and manufacture complex elements. CAx software is typically restricted to a single user paradigm, wherein only a single user can edit a model or part file within a CAx software application at a time. The user must exit the file before another user is allowed to access it.

SUMMARY

In one exemplary embodiment, a system for authorization level verification includes a host computer including a processor and a memory. The processor and memory are configured to operate a multi-user CAx environment. The host computer further includes an authorization level module and an authorization level adjustment module. The host computer is configured to communicate with a plurality of local computers. Each of the local computers are configured to operate a local CAx environment of the multi-user CAx environment. A data storage element is in communication with the host computer and is configured to store a part file compatible with the multi-user CAx environment. The authorization level module is configured to facilitate a user login from one or more of the plurality of local computers.

In another exemplary embodiment of the above described system, the authorization level module is at least one of an export control module and a clearance level module.

In another exemplary embodiment of any of the above described systems, the authorization level module includes an export control sub-module and a clearance level sub-module.

In another exemplary embodiment of any of the above described systems, the authorization level module is a component of the multi-user CAx environment.

In another exemplary embodiment of any of the above described systems, the authorization module is distinct from the multi-user CAx environment, and facilitates a user log-in to the multi-user CAx environment.

In another exemplary embodiment of any of the above described systems, the at least one of the host computer and the local computers includes a memory storing instructions operable to cause the authorization level module to retrieve an authorization level a user attempting to log in, compare the authorization level of the user to a required authorization level of every component and part within the multi-user CAx environment, and grant full multi-user CAx environment access when the multi-user CAx environment has an authorization level that meets or exceeds the required authorization level for every component and part in the multi-user CAx environment.

In another exemplary embodiment of any of the above described systems, the at least one of the host computer and the plurality of local computers includes a memory and is configured to cause the authorization level module to generate a limited access view when an authorization level of the user is less than an authorization level of at least one component or part within the multi-user CAx environment.

In another exemplary embodiment of any of the above described systems, the limited access view includes a visual representation of only components and parts having an authorization level equal to or below the user in the limited access view.

In another exemplary embodiment of any of the above described systems, the memory and processor of the host computer are configured to operate multiple, distinct, simultaneous limited access views of the multi-user CAx environment.

In another exemplary embodiment of any of the above described systems, the authorization level adjustment module is further configured to provide a prompt to at least one of the local computers when a user at one of the plurality of local computer completes an edit to one or more components and parts within the multi-user CAx environment, and wherein the prompt includes instructions directing the user to provide an updated authorization level tag corresponding to the one or more components or parts that were edited.

In another exemplary embodiment of any of the above described systems, at least one of a host computer memory and a data storage element memory includes a user credentials file operable to allow the authorization level module to identify an authorization level of a user logging into the multi-user CAx environment.

An exemplary method for controlling access to a multi-user CAx environment includes comparing an authorization level of a first user attempting to log in against an authorization level of each component and part within a multi-user CAx environment, generating a first limited access view of the multi-user CAx environment in response to the authorization level of the user being less than an authorization level of at least one of the components and parts within the multi-user CAx environment, and allowing the user to log in to the first limited access view of the multi-user CAx environment.

A further example of the above exemplary method includes generating a second limited access view of the multi-user CAx environment in response to the authorization level of a second user being less than an authorization level of at least one of the components and parts and being distinct from the authorization level of the first user.

A further example of any of the above exemplary methods further includes allowing a second user to log in to the first limited access view when the second user's authorization level is identical to the first user's authorization level.

A further example of any of the above exemplary methods further includes prompting each user within the multi-user CAx environment, thereby notifying each user within the multi-user CAx environment of an authorization level of a new user attempting to log into the multi-user CAx environment, and allowing each user within the multi-user CAx environment to indicate the presence of at least one component and part within the multi-user CAx environment that exceeds the new user's authorization level.

A further example of any of the above exemplary methods includes preventing the new user from accessing the multi-user CAx environment in response to at least one existing user indicating that at least one component or part within the multi-user CAx environment exceeds the new user's authorization level.

A further example of any of the above exemplary methods includes prompting a user within the multi-user CAx environment to update at least one authorization level tag of a component or part in response to an operation on the component or part being saved.

A further example of any of the above exemplary methods includes flagging the component or part being operated on for external authorization level review in response to no updated authorization level tag being provided by the user.

A further example of the above exemplary method includes the authorization level is at least one of an export control level and a clearance level.

A further example of the above exemplary method includes generating a limited access view comprises a visual representation of only components and parts having an authorization level equal to or below the user in the limited access view.

The various features and advantages of this disclosure will become apparent to those skilled in the art from the following detailed description. The drawings that accompany the detailed description can be briefly described as follows.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION

Figure 1:
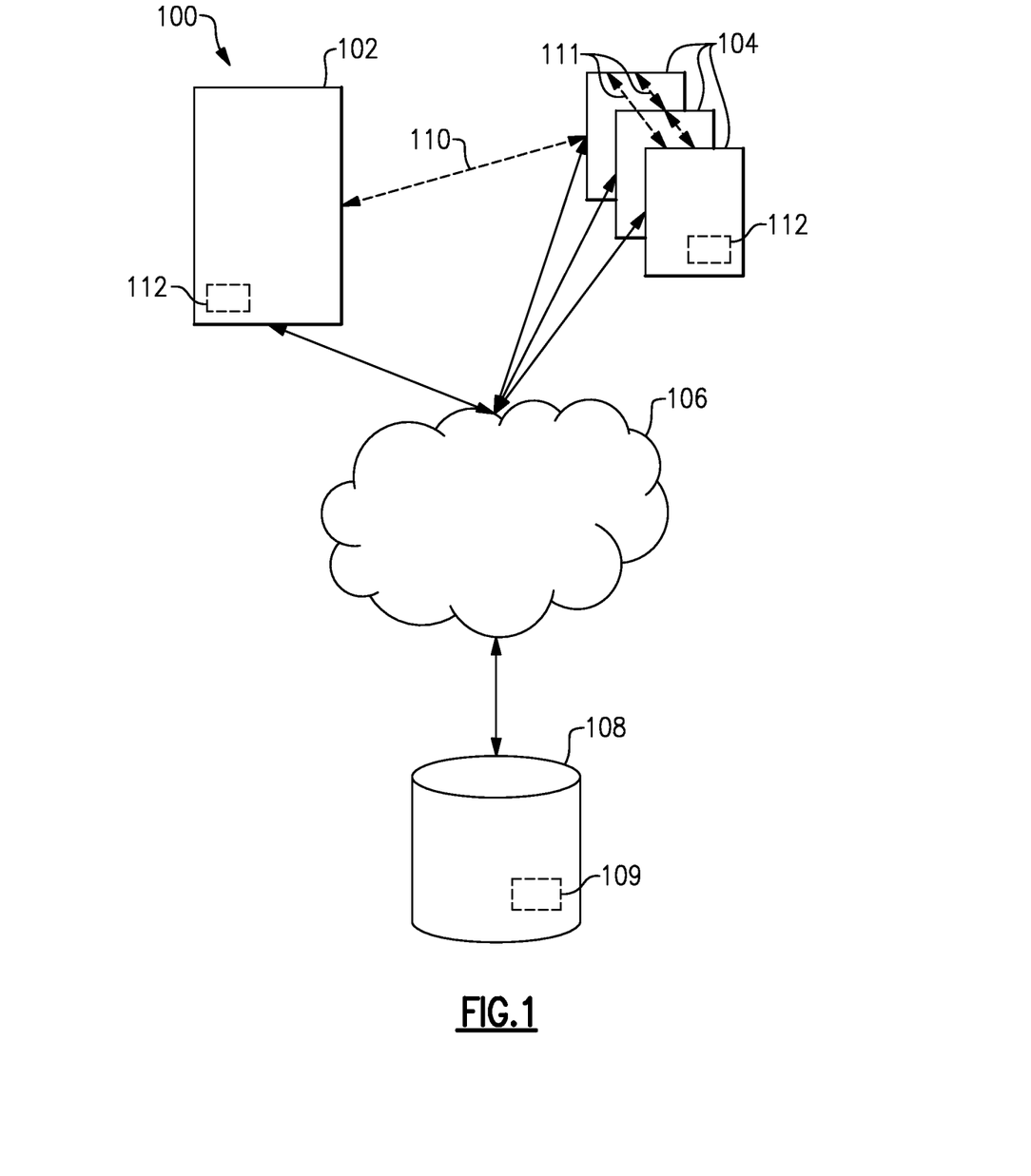
FIG. 1 illustrates an example system for a multi-user CAx environment, according to an example.

FIG. 1 illustrates an example computing architecture or system 100 for executing a multi-user CAx environment, according to an example. The system 100 includes a host computer 102. The host computer 102 may include one or more of a computer processor, memory, storage means, network device, and input and/or output devices and/or interfaces. The host computer 102 is configured to execute one or more software programs. In one example, the host computer 102 is more than one computer jointly configured to process software instructions serially or in parallel.

In some examples, the host computer 102 is in communication with one or more networks such as a network 106 comprised of one or more computing devices. The system 100 additionally includes one or more client computers 104. The host computer 102 and the one or more client computers 104 typically include one or more of a computer processor, memory, storage means, network device and input and/or output devices and/or interfaces according to some examples. The memory may, for example, include UVPROM, EEPROM, FLASH, RAM, ROM, DVD, CD, a hard drive, or other computer readable medium which may store data and/or the CAx software of this description. The host computer 102 and the one or more client computers 104 may be a desktop computer, laptop computer, smart phone, tablet, or any other computer device. In some examples, one or more of the host computer 102 and the one or more client computers 104 include an input device, such as a keyboard and mouse, and one or more output devices such as a monitor, speakers, printers, etc. The interface facilitates communication with the other systems and/or components of the network 106.

In some examples of collaboration between multiple CAx users, each of the client computers 104 is a user workstation capable of accessing and locally running CAx software and providing a CAx environment 112. In some examples, the CAx environment 112 is operable to perform one or more CAx functions including at least one CAx tool, including a computer-aided design (CAD), computer-aided engineering (CAE) and/or computer-aided manufacturing (CAM) tool, for example. In other examples, at least one of the client computers 104 is operable to execute different CAx functions. In some examples, the CAx environment 112 provides a display or visualization of a component design stored one or more part files, according to one or more visualization settings, and can be provided via one or more graphical user interfaces (GUI).

In some examples, the one or more client computers 104 are configured to communicate with the host computer 102 directly via a direct client interface 110 or over the network 106. The one or more client computers 104 are configured to execute one or more software programs, such as a CAx package. In some examples, the CAx package is configured to communicate with the host computer 102 either over the network 106 or directly through the direct client interface 110. In another example, the one or more client computers 104 are configured to communicate with each other directly via a peer-to-peer interface 111.

The network 106 may be a private local area network (LAN), a private wide area network (WAN), the Internet, a mesh network, or any other network as is known in the art. The system 100 additionally includes at least one storage system 108, which in some examples is operable to store or otherwise provide data to other computing devices. In one example, the storage system 108 is a storage area network device (SAN) configured to communicate with the host computer 102 and/or the one or more client computers 104 over the network 106. In another example, the storage system 108 is located within the host computer 102 or within at least one of the client computers 104. The storage system 108 may be configured to store one or more of computer software instructions, data, CAx files, database files, configuration information, etc.

In some examples, the system 100 is a client-server architecture configured to execute computer software on the host computer 102, which is accessible by the one or more client computers 104 using either a thin client application or a web browser executing on the one or more client computers 104. In some examples, the host computer 102 loads the computer software instructions from local storage, or from the storage system 108, into memory and executes the computer software using the one or more computer processors.

In some examples of the multi-user CAx architecture, each part file is stored within a database 109 at a central location, for instance at storage system 108. In another example, the database 109 is stored at host computer 102 or is a distributed database provided by one or more of the client computers 104. In some examples, the database 109 is a relational database, and each part file in the database 109 is associated with a sub-assembly or assembly. In some examples, the database 109 is linked or otherwise corresponds to multiple part files. In an example, the database 109 is configured to store data corresponding the component design one or more database records or entries, rather than linking or otherwise associating one or more part files to the database 109.

Each part file comprises one or more features, each feature corresponding to one or more feature types discussed below. In some examples, the part file includes a part tree or another data structure to organize and associate the features in a parent-child relationship between different features and/or part files. Each feature can be applied to one or more base features which together comprise the component design. Although the teachings of this disclosure refer primarily to featured-based CAx tools or systems, it should be appreciated that other CAx tools, systems or environments can benefit from the teachings herein, including geometrical-based CAD models.

The term "feature type" is defined as a geometric or non-geometric operation, or a result of such operation, available in a CAx tool to characterize a component design. The various feature types can be stored in one or more software libraries as one or more data classes which can be instantiated by the CAx tool.

The term "feature" refers to an instance of a feature type, which can include one or more software commands, or a result of its operation (such as a geometric object). Each feature is represented by a data set and has one or more parameters or attributes, such as a unique feature identifier, a feature type, a relative or absolute spatial position or orientation, body type such as a wireframe or solid, and/or its hierarchical relation to other features in a part tree, for example.

Some geometric feature types include two-dimensional sketches comprised of one or more one-dimensional geometries, such as points, lines or curves, and two-dimensional geometries such as rectangles or ellipses. A sketch, in some instances, provides a rough approximation of the desired dimensioning of the various aspects of a component design. In yet other examples, the feature types include various operations to create or modify solid(s) or other three-dimensional geometry such as wireframes, from one or two dimensional features. These various feature types include extrude(s), revolve(s), loft(s), sweep(s), chamfer(s), boundaries, and meshes, for example. The feature types can include operations such as a Boolean operation to add or subtract one feature from another feature, a mirror or a pattern operation to replicate at least one other feature, and an edge blend operation.

Various non-geometric feature types are contemplated including datum such as point(s), plane(s), axes, and coordinate system(s) utilized to arrange or orient other features, and in some instances may not comprise a final design of the component. Other non-geometric feature types can be used to further characterize a base feature comprising a component design, such as surface shading and coloring, material composition and dimensions. Of course, many other feature types utilized to create and further define the various aspects of a component design are contemplated within the teachings of this disclosure.

These various feature types and corresponding features typically have different levels of relevance to various disciplines involved in the collaboration of a component design. Each feature type and feature can also have different levels of applicability with respect to artifacts of the design process, including two-dimensional drawings such as schematics, engineering drawings or blueprints, wireframe models, surface models, and solid models, and also as inputs to other CAx tools such as finite element analysis (FEA) and computational fluid dynamics (CFD) models.

In some examples, the CAx environment 112 is configured to designate one or more features or feature types as a layer. Example layers include sketches, wireframes and solids, which in some examples are provided by the CAx software as default layer(s). In other examples, a user manually selects feature(s) and/or feature type(s) to be associated with at least one custom layer. In some examples, each layer is defined at system initialization, and in other examples, each layer is defined during operation. Each layer is utilized to filter the selected features or feature types in a part file loaded into the CAx environment.

Multiple users each provided with a CAx environment 112 via the client computers 104 are able to simultaneously access each part file stored in the database 109 and are able to make modifications to various aspects of a component design corresponding to one or more part files. In some examples, the part file is stored locally at the storage system 108, with local copies of the part file at the client computers 104 being synchronized periodically. Modifications to each part file are communicated to each CAx environment currently accessing the part file, either in real-time or periodically utilizing a synchronization scheme. Display or visualization of the modification is therefore made substantially immediately available in CAx environments accessing the same part file, which can assist the multiple users in identifying conflicts or inconsistencies in various aspects of a component design, thereby ensuring that a particular design intent is met.

In some situations, the multiple users who use a CAx environment 112 are assigned with different level(s) of access to the component design via a user profile. For example, the component design, or various aspects of the component design including the feature(s) or feature type(s), can be associated with one or more of the level(s) of access. In some examples, different levels of access are designated for users that are restricted from access due to export controls, security classification or proprietary restrictions. Other restricted and unrestricted levels of access are contemplated in this disclosure, including job disciplines and organization structures, for example. Accordingly, it may be desirable to limit the visualization of a particular aspect of a component design depending on the level(s) of access provided to a particular user profile. Each user profile corresponds to one or more access lists setting the level(s) of access for each user profile.

Figure 2A:
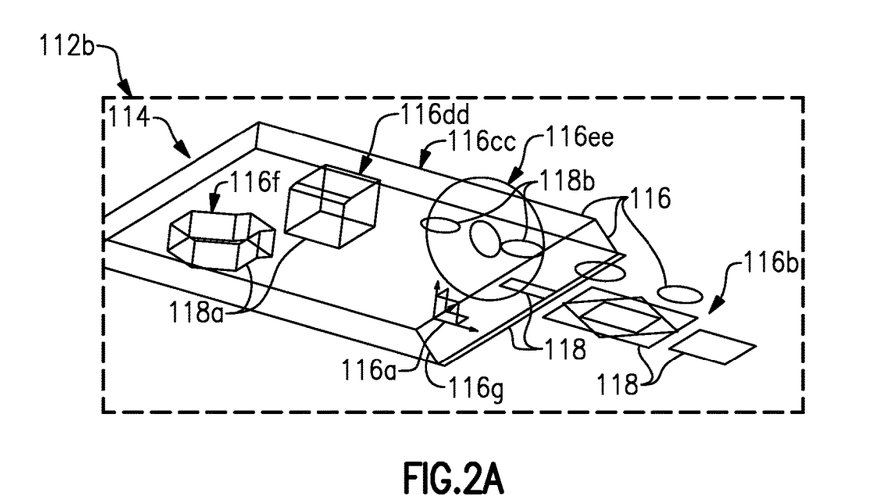
FIG. 2A illustrates a sample component design displayed in a first CAx environment, according to an example.
Figure 2B:
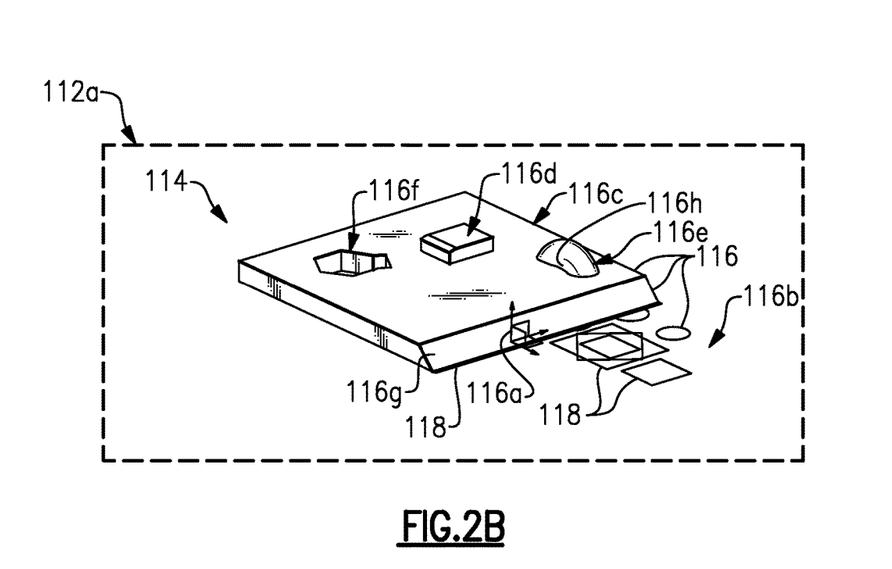
FIG. 2B illustrates the sample component design of FIG. 2A displayed in a second CAx environment, according to an example.

FIGS. 2A-2B illustrate one example in which two users collaborate on various aspects of a component design 114. In this example, a first user is provided with a first CAx environment 112a, and a second user is provided with a second CAx environment 112b, shown in FIGS. 2A-2B respectively. Each of the CAx environments 112a, 112b is associated with a different one of the client computers 104, for example.

The example component design 114 includes one or more features 116 each corresponding to a feature type. The features 116 shown in FIG. 2A include a datum coordinate system 116*a*, and a sketch 116*b* having one or more sketch entities or geometries 118 illustrated as ellipses and rectangles, for example. Some features 116 shown in FIG. 2B include solids such as extrudes 116*c*, 116*d*, which are applied to geometries 118 of the sketch 116*b* and are characterized by wireframes 116*cc*, 116*dd* shown in FIG. 2A. Other example features include a hole or Boolean 116*f* forming an opening in the extrude 116*c*, and a chamfer 116*g* applied to extrude 116*c*. Non-geometric features include surface shading 116*h* (shown in FIG. 2B) applied to the rotate 116*e* feature.

Each of the multiple users is able to select one or more visualization settings to characterize the display of the component design 114 in a viewing frustum 115 provided by a CAx environment 112 based on the particular situation, as illustrated in FIGS. 2A-2B. For the purposes of this disclosure, the term "visualization setting" means data corresponding to one or more features, feature types, layers or other parameters which can be utilized to display a component design 114 in a CAx environment 112. The term "viewing frustum" refers to a region of modeling space in a window of the CAx environment 112 modeling the component design 114 that characterizes the display of a model or component design 114, in a graphical user interface (GUI) for example. The viewing frustum is characterized by the spatial position and/or orientation of the component design 114 in the modeling space. The CAx environment 112 displays selected portions of the component design 114 stored in one or more part files based on these visualization setting(s). Accordingly, modifications or updates made by other user(s) to the component design may not be displayed in the CAx environment 112.

FIGS. 2A and 2B illustrate different visualization settings for CAx environments 112*a*, 112*b*. As illustrated by the CAx environment 112*a* in FIG. 2A, the user has selected one or more visualization settings to show the wireframe geometries 116*cc*, 116*dd*, 116*ee* and to hide the corresponding solid features 116*c*, 116*d*, 116*e*. In the CAx environment 112*b* shown in FIG. 2B, the user has selected one or more visualization settings to show solid features 116*c*, 116*d*, 116*e* and to hide wireframes 116*c*, 116*d*, 116*f*, for example. The visualization settings of each CAx environment 112 can be customized according to the needs of a particular situation even though each of the users is working on the same component design 114.

With continued reference to FIGS. 1, 2*a* and 2*b*, FIG. 3 illustrates the computing architecture or system 100 for executing a multi-user CAx environment with the added inclusion of an export control module 120. In the illustrated example, the export control module 120 is a module contained within the CAx environment 112 running on the host computer 102. In alternative examples, the export control module 120 can be a distinct module operating in the host computer 102 and facilitating log in to the multi-User CAx environment 112 for each of the users. In general terms, the export control module 120 can be referred to as an authorization level module, and can apply any type of authorization level credentials without being limited to export controls and clearance levels.

Figure 3:
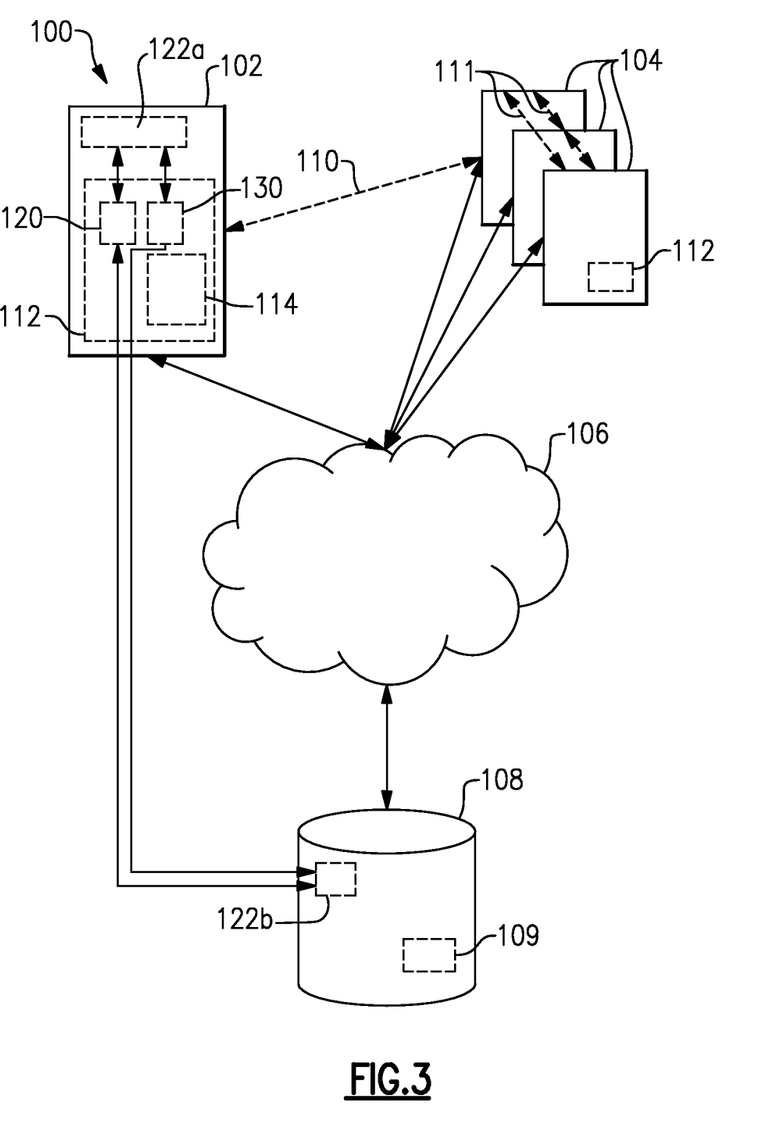
FIG. 3 illustrates a further example system for a multi-user CAx environment including export and clearance controls.
Figure 4:
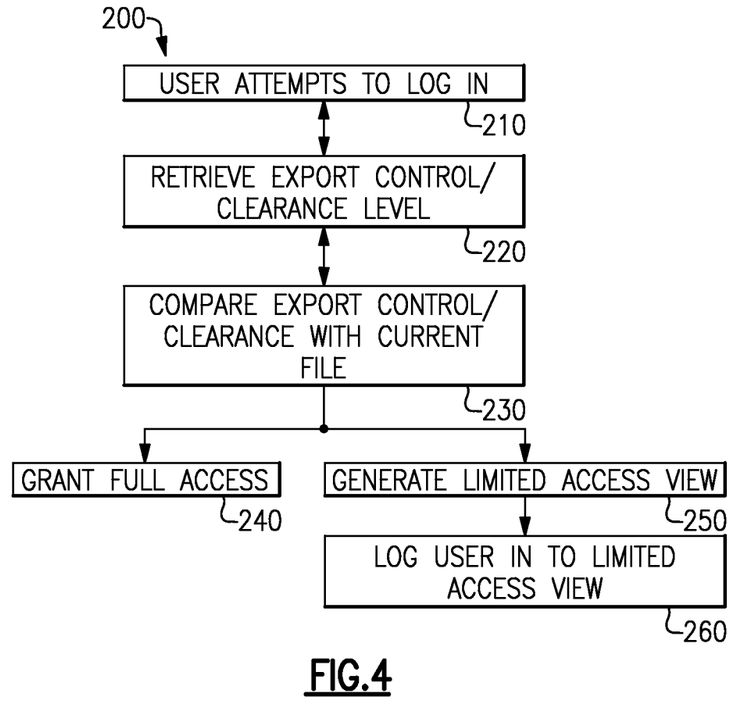
FIG. 4 illustrates a method for verifying the export control level, clearance level or nationality of a user logging into a CAx environment.

With continued reference to FIG. 3, FIG. 4 illustrates an example method for verifying the export control level, clearance level or nationality of a user logging into a CAx environment 112 at a local computer 104. Initially, a user logs in at a local computer 104 by providing the user's login information at block 210. The user's log in information is provided to the host computer 102, and the host computer verifies the user's login credentials. In some examples, the user's log in credentials are verified by a password provided by the user and compared to a stored password at the host computer 102. In other embodiments, single sign on methods may be used such as active directory, LDAP, etc. The user's login credentials further include the user's nationality and clearance level. In examples where the export control module 120 is distinct from the multi-user CAx environment 112 and facilitates a user log in to the multi-user CAx environment 112, the export control module 120 includes protocols defining the type of log in verification used.

After the log in credentials have been verified by the host computer 102, the export control module 120 determines a nationality and clearance levels of the user attempting to log in at block 220. In some examples user credentials are stored locally at a memory 122*a* in the host computer 102 and are retrieved by the export control module 120. In alternative examples, the credentials are stored remotely in a memory 122*b* of the data storage element 108, or in any other remote data storage element with which the export control module 120 can communicate.

Once the export control or clearance levels of the user logging in to the multi-user CAx environment 112 are retrieved, the export control module 120 compares, at block 230, the export control or clearance levels of the user logging in against nationality and clearance level flags corresponding to each of the components and parts that are being viewed in the multi-user CAx environment 112 which the user is attempting to join. If the user's nationality and clearance levels meet or exceed the requirements of all the components and parts within the current multi-user CAx environment 112, the user is permitted full access to the multi-user CAx environment 112 by the host computer 102 at block 240.

If the user's credentials do not meet the required export control or clearance level credentials of one or more component and part within the current multi-user CAx environment 112, the export control module 120 compares each component in the current session against the user's export control and clearance level at and generates a limited access view 114 of the multi-user CAx environment 112 at 250.

Once the limited access view 114 is generated, the user is logged in to the limited access view 114 at block 260. The limited access view 114 allows the user to see any components where the users nationality and clearance level meet or exceed the requirements, as established in the comparison at block 230. In the case of multiple users accessing the multi-user CAx environment 112, each of whom has a clearance level or export control that is below the required level for at least one component or part, a distinct limited access view 114 is created for each user based on their specific clearance level and export control. In some examples, when two users have identical clearance levels and export controls, the users can share a limited access view 114.

In some examples, the export control module 120 can further provide a message prompt to each other local CAx environment on the local computers 104 notifying the other users that a clearance restricted or export restricted participant has joined the multi-user CAx environment 112, thereby preventing other users from inadvertently violating clearance or export controls in their communications.

While the above operation of the export control module is described with regards to a static export control and clearance level of each of the components or parts in a given multi-user CAx environment, it is understood that certain operations or changes to the components or parts can raise, lower or eliminate the appropriate export control or clearance level for the component or part being operated on. In order to facilitate changing export control or clearance level requirements, the multi-user CAx environment 112 includes an export control adjustment module 130. As with the export control module 120, the export control adjustment module 130 can be referred to in general terms as an authorization level adjustment module 130, and can facilitate adjustment of any type of authorization level without being limited to export control levels and clearance levels.

Figure 5:
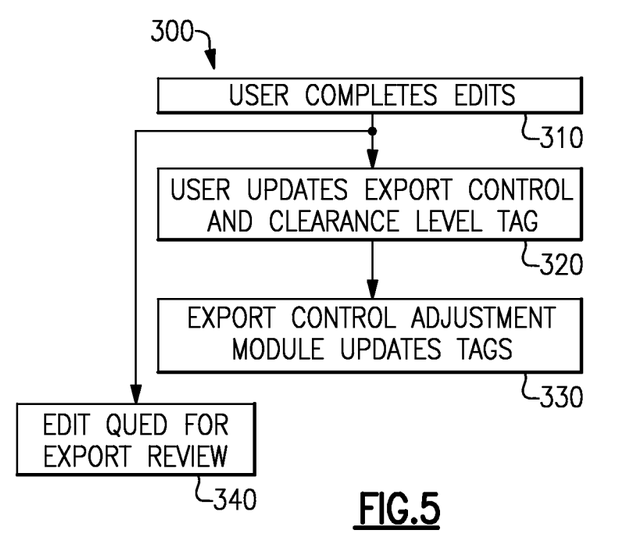
FIG. 5 illustrates a method for tagging revised components or parts within the multi-user CAx environment 112 with an updated export control or clearance level.

With continued reference to FIG. 3, FIG. 5 illustrates a flowchart 300 of a method for tagging revised components or parts within the multi-user CAx environment 112 with an updated export control or clearance level. Initially a user completes edits to a component or part file at block 310. When the edit is completed, the export control adjustment module 130 prompts the editing user with a request for an updated export control or clearance level. The prompt can be provided either directly through the CAx environment 112 with the prompt being displayed on the local computer 104 of the user making the edits, or via an alternate communication means such as e-mail.

Once prompted, the user updates a tag identifying whether the component or part is export controlled, how the component or part is export controlled, and what clearance level is required to view the component or part at block 220. The update is achieved in one example by the host computer 102 sending a prompt to the corresponding local computer 104 requesting the updated clearance or export control information any time the user saves or exits a session.

Once the updated tag has been received at the export control adjustment module 130, the export control adjustment module 130 updates an entry in the memory 122a, 122b corresponding to the component or part that was edited at block 330. The updated entry reflects the new export control or clearance level. In some examples, the memory 122a, 122b can further include a revision history file for some or all of the components or parts, with the revision history file indicating an export control or clearance tag of the component or part at each point in which the component or part was edited.

In some examples, the user editing the component or part may be unqualified to, or otherwise unable to, determine the appropriate clearance level or export control for the edited component. In such an example, changes to a parts file may be queued for review by experts in export classification at 340. In one such example, the file itself is queued for review by the export control adjustment module 130. In another such example, a review request is queued or sent as a notification to an export classification expert.

Once queued, the users can continue working in the multi-user CAx environment 112 with the current export control levels, and the experts may review the revised files and provide appropriate classification. As each change is saved, the changed file may trigger additional review by export classification experts. In one example, when a file is saved the system may lock the file and prevent others from viewing the file until an export classification verifies that the classification of the part file is correct.

In some examples, the export control module 120 may not have access to the export control level of one or more of the components or parts being operated on within the multi-user CAx environment 112. This can occur when one or more parts predates the installation of the multi-user CAx system 100, a connection between the export control module 120 and the memory 122a, 122b is interrupted, or for any other reason.

In order to continue operations within the CAx environment 112 when the export control or clearance level information cannot be retrieved, a secondary export control check process can be performed by the export control module 120.

Figure 6:
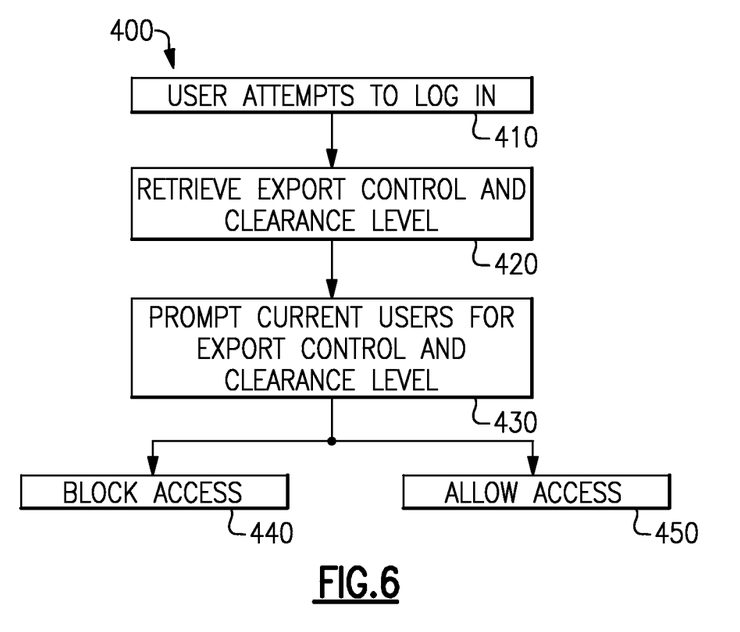
FIG. 6 illustrates a secondary export control check process for the example system of FIG. 3.

With continued reference to FIG. 3, FIG. 6 illustrates one such secondary export control check process 400. In the secondary export control check process 400, the export control module 120 on the host computer 102 verifies a user's log in credentials when the user attempts to log in at block 410. The initial log in and credentials verification occurs as described previously with regards to FIG. 4. Once the user's log in credentials are verified, the export control module 120 attempts to determine the export control level of each of the components or parts currently in the multi-user CAx environment 112 at block 420.

When the export control module 120 fails to retrieve at least one of the appropriate export control levels, the export control module 120 provides a prompt to each user in the multi-user CAx environment 112 at block 430. The prompt notifies each user currently in the multi-user CAx environment 112 of the nationality and clearance information of the user attempting to join the multi-user CAx session and requests that each other user verify that the new user's nationality and clearance information do not contradict the export controls and clearance levels of any parts open within the multi-user CAx environment 112.

If any of the other users is viewing or working on any features that violate the export control level or clearance level of the user who wants access to the session, the other user indicates as such in response to the prompt by the host computer 102. If any user indicates that they are currently working on or viewing parts or components that violates the export credentials or security clearance of the new user, the new user is denied access to the session entirely at block 440. If no users indicate that they are currently working on or viewing parts or components that violate the export credentials or security clearance of the new user, the user is granted full access at block 450.

While described above with general regards to export controls and clearance levels, one of skill in the art having the benefit of this disclosure will understand that the above system can be applied to alternate user clearance levels or other required qualifications and maintain the above described functionality. Further, in some examples a user's clearance levels and nationality for export control can both be checked by a single system according to the above description, or by two similar systems running concurrently within a single multi-user CAx environment 112.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system for authorization level verification comprising:
    a host computer including a processor and a memory, the processor and memory configured to operate a multi-user CAx environment, the host computer further including an authorization level module and an authorization level adjustment module;

said host computer configured to communicate with a plurality of local computers, each of said local computers configured to operate a local CAx environment of said multi-user CAx environment;

a data storage element in communication with said host computer and configured to store a part file compatible with said multi-user CAx environment; and wherein the authorization level module is configured to facilitate a user login from one or more of said plurality of local computers; and wherein at least one of said host computer and said plurality of local computers includes a memory and is configured to cause the authorization level module to generate a limited access view when an authorization level of the user is less than an authorization level of at least one component or part within said multi-user CAx environment, wherein the limited access view includes a visual representation of only components and parts having an authorization level equal to or below the authorization level of the user in the limited access view; and wherein the authorization level module is configured to prompt each user within the multi-user CAx environment with an authorization level of a new user in response to the new user attempting to join the multi-user CAx environment, and configured to allow each user within the multi-user CAx environment to indicate the presence of at least one component and part within the multi-user CAx environment that exceeds the new user's authorization level.

2. The system of claim 1, wherein the authorization level module is at least one of an export control module and a clearance level module.

3. The system of claim 2, wherein the authorization level module includes an export control sub-module and a clearance level sub-module.

4. The system of claim 1, wherein the authorization level module is a component of the multi-user CAx environment.

5. The system of claim 1, wherein the authorization module is distinct from the multi-user CAx environment, and facilitates a user log-in to the multi-user CAx environment.

6. The system of claim 1, wherein at least one of said host computer and said local computers includes a memory storing instructions operable to cause the authorization level module to retrieve an authorization level a user attempting to log in, compare the authorization level of the user to a required authorization level of every component and part within the multi-user CAx environment, and grant full multi-user CAx environment access when said multi-user CAx environment has an authorization level that meets or exceeds the required authorization level for every component and part in said multi-user CAx environment.

7. The system of claim 6, wherein the memory and processor of the host computer are configured to operate multiple, distinct, simultaneous limited access views of the multi-user CAx environment.

8. The system of claim 6, wherein the authorization level adjustment module is further configured to provide a prompt to at least one of said local computers when a user at one of the plurality of local computer completes an edit to one or more components and parts within the multi-user CAx environment, and wherein the prompt includes instructions directing the user to provide an updated authorization level tag corresponding to the one or more components or parts that were edited.

9. The system of claim 1, wherein at least one of a host computer memory and a data storage element memory includes a user credentials file operable to allow the authorization level module to identify an authorization level of a user logging into the multi-user CAx environment.

10. A method for controlling access to a multi-user CAx environment comprising:
    comparing an authorization level of a first user attempting to log in against an authorization level of each component and part within a multi-user CAx environment;
    generating a first limited access view of the multi-user CAx environment in response to an authorization level of the user being less than an authorization level of at least one of the components and parts within the multi-user CAx environment, wherein the limited access view includes a visual representation of only components and parts having an authorization level equal to or below the authorized level of the user in the limited access view;
    allowing the user to log in to the first limited access view of the multi-user CAx environment;
    prompting each user within the multi-user CAx environment, thereby notifying each user within the multi-user CAx environment of an authorization level of a new user attempting to log into the multi-user CAx environment; and
    allowing each user within the multi-user CAx environment to indicate the presence of at least one component and part within the multi-user CAx environment that exceeds the new user's authorization level.

11. The method of claim 10, further comprising generating a second limited access view of the multi-user CAx environment in response to the authorization level of a second user being less than an authorization level of at least one of the components and parts and being distinct from the authorization level of the first user.

12. The method of claim 10, further comprising allowing a second user to log in to the first limited access view when the second user's authorization level is identical to the first user's authorization level.

13. The method of claim 10, further comprising preventing the new user from accessing the multi-user CAx environment in response to at least one existing user indicating that at least one component or part within the multi-user CAx environment exceeds the new user's authorization level.

14. The method of claim 10, further comprising:
    prompting a user within the multi-user CAx environment to update at least one authorization level tag of a component or part in response to an operation on the component or part being saved.

15. The method of claim 14, further comprising:
    flagging the component or part being operated on for external authorization level review in response to no updated authorization level tag being provided by the user.

16. The method of claim 10, wherein the authorization level is at least one of an export control level and a clearance level.

* * * * *